United States Patent
Manethou

[15] 3,646,310
[45] Feb. 29, 1972

[54] HIGH-FREQUENCY STARTING DEVICE FOR AN ELECTRIC WELDING ARC

[72] Inventor: Jean Manethou, Montsoult, France

[73] Assignee: L'Air Liquide Societe Anonyme Pour E'Etude Et L'Exploitation Des Procedes Georges Claude, Paris, France

[22] Filed: June 22, 1970

[21] Appl. No.: 47,970

[52] U.S. Cl...........................219/135, 219/131
[51] Int. Cl...........................B23k 9/10
[58] Field of Search..........219/131, 135; 315/261, 330, 315/335; 313/197, 198

[56] References Cited

UNITED STATES PATENTS

| | | |
|---|---|---|
| 1,863,702 | 6/1932 | Smith...........................313/197 X |
| 2,516,016 | 7/1950 | Pakala...........................219/131 |
| 2,516,037 | 7/1950 | Williams...........................219/131 |
| 2,532,807 | 12/1950 | Girard et al...........................219/131 X |
| 2,716,198 | 8/1955 | McCallum...........................313/308 X |
| 2,754,349 | 3/1957 | Anderson...........................219/135 X |
| 3,335,317 | 8/1967 | Sciaky...........................219/131 X |

Primary Examiner—J. V. Truhe
Assistant Examiner—George A. Montanye
Attorney—Young & Thompson

[57] ABSTRACT

A device for starting an electric arc welding torch. To the nozzle of the torch are attached two auxiliary electrodes energized by a high-frequency electric current generator through coaxial cables. There is no electric connection between the welding electrode and the auxiliary electrodes.

4 Claims, 2 Drawing Figures

PATENTED FEB 29 1972 3,646,310
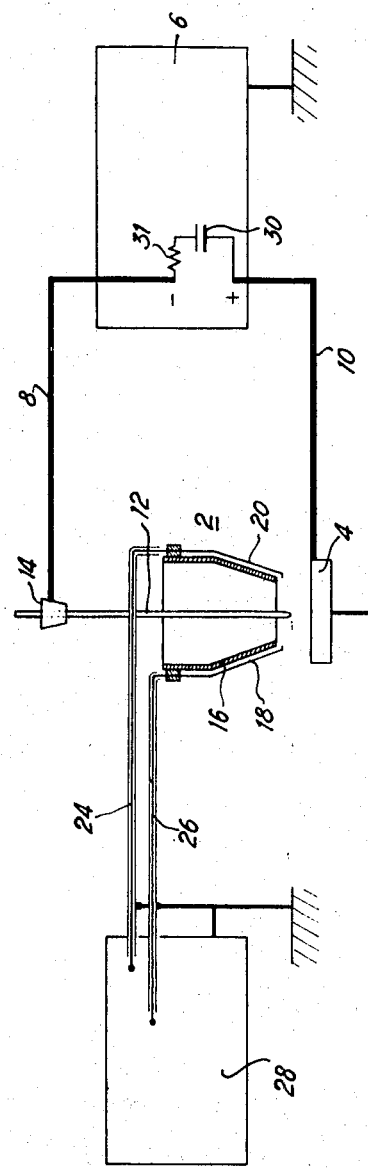
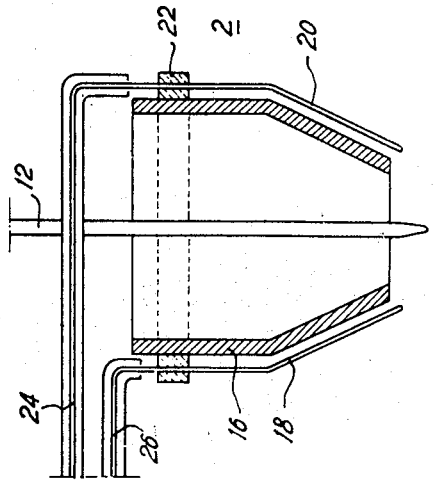
INVENTOR.
JEAN MANETHOU
BY Young & Thompson
ATTYS.

HIGH-FREQUENCY STARTING DEVICE FOR AN ELECTRIC WELDING ARC

The present invention relates to a device for starting or striking by means of high-frequency discharge a welding or cutting operation with an electric arc in a rare gas atmosphere, using an infusible electrode, comprising a welding or cutting current generator, a torch with a nozzle surrounding the said electrode and a high-frequency current generator for the starting operation.

In the usual arrangements of this type, the welding or cutting voltage supplying the infusible electrode has superimposed thereon the high-frequency voltage which causes the remote starting or striking, that is to say, without having to touch the part to be worked with the electrode; this absence of contact avoids any deterioration of the electrode and the inclusion of metal from this electrode in the weld.

This process has certain disadvantages:

The high-frequency current generator is traversed by the welding current, and this makes it necessary to increase the size of certain of its constituents; the losses of high-frequency voltage are considerable, because the corresponding current has to travel throughout the length of the cables provided for the welding current; these losses can be sufficiently large for the remote starting not to take place;

parasitic radioelectric waves are emitted to a considerable extent, because the welding cable forms an antenna and cannot be shielded, which would too greatly reduce its flexibility, especially as it is of large cross section.

The arrangement according to the invention does not have these disadvantages. It is characterized in that the said generator is connected by coaxial cables to two electrodes fixed to the nozzle of the torch and that it is not connected to the welding or cutting electrode.

As the high-frequency generator is not traversed by the welding current, it can be lighter and of smaller dimensions. The coaxial cables carrying the high-frequency only cause fairly small losses and radiate practically no parasitic radioelectric waves.

The accompanying drawing shows one embodiment of the invention in diagrammatic form and as a nonlimiting example.

FIG. 1 shows a circuit diagram of apparatus according to the present invention.

FIG. 2 shows a section of an end of a torch.

Only the terminal portion of the torch is shown; this is a torch used for effecting a weld on a workpiece 4. The welding current is supplied by a direct current generator 6 which is connected by cables 8, 10 to the welding electrode 12 and to the element; the connection with the electrode is provided by contact jaws 14 or a chuck which can be slackened off for adjusting the position of the electrode. The frame of the generator and the element are connected to earth.

The electrode 12 is enclosed by a nozzle made of refractory material 16. A protective gas stream, for example argon, passes into the nozzle; it isolates the arc and the molten metal bath from the ambient atmosphere.

Fixed to the nozzle are two auxiliary electrodes 18, 20 which, by high-frequency discharges flashing between them, cause the striking of the welding arc when the voltage for the welding has been applied to the workpiece and to the electrode 12. These auxiliary electrodes are fixed to the nozzle by an insulating support 22 in the form of a collar; they consist for example of tungsten, thoriated tungsten, stainless steel or any other suitable material; the diameter thereof is advantageously 1 mm. to 1.6 mm. The distance between the ends of these electrodes is generally from 1 to 3 cm.

The central wires of two coaxial cables 24, 26 are respectively connected at one end to the auxiliary electrodes and at the other end to the output terminals of a high-frequency and high-voltage current generator 28. The casings of these cables are earthed.

The cables 24, 26 can be of small diameter and thus flexible, because the current flowing through them is at high voltage and only has a very low intensity. They can be disposed in the same casing, but this solution is less economical. The placing of the welding cable and one or two high-frequency cables in the same casing is avoided.

For example, the generator 28 is of the sparking type and produces, at each half-cycle of the voltage which supplies it, a wave train at a frequency of the order of 1 megacycle, with a maximum voltage of a few thousands of volt and a maximum current of a few milliamperes.

The auxiliary electrodes extend slightly beyond the nozzle and are disposed substantially symmetrically on either side of the welding electrode. The high-frequency discharge thus produces a strong ionization in a zone comprising the path from the electrode 12 to the workpiece 4, this ionization permitting the welding arc to strike or start.

A capacitor 30 is connected in shunt to the output terminals of the generator 6; its capacity is of the order of 800 microfarads and it can be connected in series with a resistance 31 of a few ohms. This arrangement makes more efficient the striking of the welding arc: at the moment of the flashing of the high-frequency discharge, the capacitor 30, charged by the welding current source, is discharged between the electrode 12 and the workpiece 4, thereby providing a brief current peak which is of high intensity.

The resistance 31 protects the capacitor 30 in the event of abnormal voltage; in addition, it makes the discharge of the capacitor less brief, but less intense. This resistance can be omitted in many cases.

The installation as illustrated can be modified without departing from the scope of the present invention. For example, the nozzle can be of refractory, electrically insulating, substance, or comprise a coating or a sheathing of such a substance; it is then not always necessary for the two auxiliary electrodes to be electrically insulated from the nozzle. It is possible to have more than two auxiliary electrodes, disposed symmetrically around the welding electrode, if the high-frequency current is a polyphase current. The capacitor 30 can be omitted; so can the resistance 31.

The invention can be applied not only to welding, but also to surfacing, which is a variant of welding, and to arc cutting.

The generator 6 can supply not direct current, but alternating current; in this case, the capacitor 30 will have to be chosen to be of a nonpolarized type and its capacity will be lowered to about 20 microfarads.

What I claim is:

1. Apparatus for electric arc welding or cutting a workpiece, comprising an infusible electrode; a current carrying cable; a nozzle surrounding said infusible electrode, said nozzle being hollow and shaped for directing a rare gas atmosphere toward an arc end thereof and a first end of said infusible electrode; support means for supporting said infusible electrode in a position with said first end thereof extending outwardly beyond the arc end of said nozzle; a main current generator having at least a first and second output terminal, said first output terminal being electrically connected to said infusible electrode by means of said current-carrying cable; means for electrically connecting said workpiece to said second output terminal to permit an electric arc to be established between said workpiece and said infusible electrode; and arc initiating means for initiating an arc between said electrode and said workpiece, said arc-initiating means including at least a pair of auxiliary electrodes connected to said nozzle to extend slightly beyond the arc end of said nozzle and positioned in substantially symmetrical relationship on either side of said infusible electrode so that an electric discharge between said auxiliary electrodes occurs along a path through the longitudinal axis of said infusible electrode adjacent said first end thereof; a high-frequency current generator means having a pair of output terminals for initiating an electric discharge between said auxiliary electrodes; at least a pair of conductors connected at one end to said auxiliary electrodes respectively and connected at the other end to said pair of output terminals of said high-frequency generator means, respectively; and coaxial shielding means surrounding each said conductor along the entire length thereof for preventing radiation of energy from said high-frequency current generator means, said current-carrying cable being located outside said coaxial shielding means.

2. Apparatus as claimed in claim 1, including a shunt connected to said first and second output terminals of said main current generator, said shunt including a capacitor and resistor in series.

3. Apparatus as claimed in claim 1 wherein said coaxial shielding means includes a grounded casing, said conductors being disposed within said casing.

4. Apparatus as claimed in claim 1 wherein said coaxial shielding means includes at least a pair of grounded casings, said conductors being disposed within said casings, respectively.

* * * * *